United States Patent
Angelopoulos

(10) Patent No.: US 8,227,076 B2
(45) Date of Patent: Jul. 24, 2012

(54) MULTIFUNCTIONAL NANOCOATINGS AND PROCESS FOR FABRICATING SAME

(75) Inventor: Anastasios Angelopoulos, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 1206 days.

(21) Appl. No.: 12/025,923

(22) Filed: Feb. 5, 2008

(65) Prior Publication Data

US 2012/0148813 A1    Jun. 14, 2012

(51) Int. Cl.
*B32B 27/32* (2006.01)
*B32B 5/16* (2006.01)
*B32B 9/04* (2006.01)
*B32B 15/04* (2006.01)
*B32B 27/34* (2006.01)

(52) U.S. Cl. ........ 428/323; 428/331; 428/332; 428/339; 428/411.1; 428/457; 428/474.4

(58) Field of Classification Search ............... None
See application file for complete search history.

(56) References Cited

U.S. PATENT DOCUMENTS

| 6,881,448 | B1 | 4/2005 | Hattori |
| 2006/0062982 | A1 | 3/2006 | Hammond Cunningham et al. |
| 2007/0106006 | A1 | 5/2007 | Cooper et al. |
| 2007/0141238 | A1 | 6/2007 | Angelopoulos et al. |
| 2011/0250427 | A1 * | 10/2011 | Kotov et al. ............ 428/300.7 |

* cited by examiner

*Primary Examiner* — Sheeba Ahmed
(74) *Attorney, Agent, or Firm* — Dinsmore & Shohl LLP

(57) ABSTRACT

Embodiments of a coated substrate comprise a substrate (100) and a multi-layer multi-functional nanoparticle coating (105) having a thickness of up to about 500 nm thereon. The nanoparticle coating (105) comprises an ionic polyelectrolyte layer (110), and an ionic multi-colloid layer disposed over the polyelectrolyte layer (110). The multi-colloid layer comprises hydrophilic colloid ions (130) disposed over and coupled to the polyelectrolyte layer (110), conductive colloid ions (120) disposed over and coupled to the polyelectrolyte layer (110). The conductive colloid ions (120) are separated from the hydrophilic colloid ions (130) by repulsive forces therebetween.

24 Claims, 1 Drawing Sheet

MULTIFUNCTIONAL NANOCOATINGS AND PROCESS FOR FABRICATING SAME

CROSS-REFERENCED TO RELATED APPLICATIONS

The present application is related to co-depending U.S. application Ser. No. 12/025,920 filed Feb. 5, 2008.

FIELD OF THE INVENTION

Embodiments of the present invention are generally related to multi-layer nanoparticle coatings, and are specifically related to multi-layer nanoparticle coatings configured to be conductive and hydrophilic.

BACKGROUND OF THE INVENTION

Multi-layer nanoparticle assemblies have been recognized as being beneficial in various industrial applications, for example, fuel cell applications, electronics, cell biology, biomedicine, and pharmaceuticals. Referring to FIG. 1 (Prior Art), a conventional assembly comprises a substrate 10 (for example, a conductive gold substrate), a cationic layer 20 (for example, a copolymer of acrylamide and a quarternary ammonium salt) over the substrate 10, and an anionic layer 30 comprised of nanoparticles (for example, silica nanoparticles) that bind to the cationic layer 20. The substrate 10 may comprise multiple cationic 20/anionic 30 bilayers over the substrate 10.

By adding the silica nanoparticles, the coated substrate is made hydrophilic, which may be beneficial for various industrial applications such as fuel cells; however, the coating may cause the substrate to lose its electrical conductivity. In the above example, the hydrophilicity of the coated substrate is demonstrated by an advancing contact angle of 16° and a receding contact angle of 9° whereas an uncoated substrate demonstrates (more hydrophobic) advancing and receding contact angles of 84° and 18°, respectively. However, an electrical contact resistance of 174 m$\Omega$-cm$^2$ was measured at a contact pressure of 200 psi for the substrate coated on both sides compared to a contact resistance of 23 m$\Omega$-cm$^2$ for the bare substrate at the same contact pressure, thereby demonstrating that the silica nanoparticles are electrically insulating, not electrically conductive. The present inventors have recognized the importance of achieving both conductivity and hydrophilicity, especially in industrial applications such as PEM fuel cells. Consequently, the multi-layer nanoparticle coating of the present invention is optimized to achieve both of these properties.

SUMMARY OF THE INVENTION

According to one embodiment of the present invention, a coated substrate comprising a substrate and a multi-layer nanoparticle coating having a thickness of up to about 500 nm is provided. The nanoparticle coating comprises an ionic polyelectrolyte layer, and an ionic multi-colloid layer disposed over the polyelectrolyte layer. The multi-colloid layer comprises hydrophilic colloid ions disposed over and coupled to the polyelectrolyte layer, and conductive colloid ions disposed over and coupled to the polyelectrolyte layer. The conductive colloid ions are separated from the hydrophilic colloid ions by repulsive forces therebetween.

According to another embodiment of a nanoparticle coating, the coating comprises a cationic polyelectrolyte layer comprising a polyacrylamide (copolymer of acrylamide and a quarternary ammonium salt), and an anionic multi-colloid layer disposed over the cationic polyelectrolyte layer. The anionic multi-colloid layer comprises anionic hydrophilic colloid ions comprising silica nanoparticles, wherein the anionic hydrophilic colloid ions are disposed over and coupled to the cationic polyelectrolyte layer. The anionic multi-colloid layer further comprises anionic conductive colloid ions comprising carbon based nanoparticles, wherein the anionic conductive colloid ions are disposed over and coupled to the cationic polyelectrolyte layer. The anionic conductive colloid ions are separated from the hydrophilic colloid ions by repulsive forces.

According to yet another embodiment, a method of providing a nanocoating on a substrate is provided. The method comprises the steps of providing a substrate surface, applying a solution comprising cationic polyelectrolytes and anionic conductive colloid ions onto the substrate surface, wherein the anionic conductive colloid ions are coupled to the cationic polyelectrolytes. The method further comprises forming the nanocoating by immersing the substrate comprising the cationic polyelectrolytes, and anionic conductive colloid ions into a solution comprising anionic hydrophilic colloid ions. The anionic hydrophilic colloid ions couple to the cationic polyelectrolyte layer but are spaced from the anionic conductive colloid ions by repulsion.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

Figure 1:
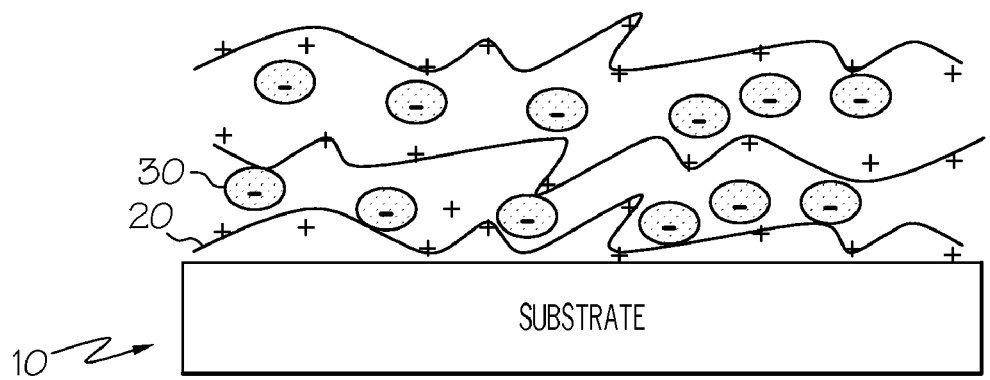
FIG. 1 (Prior Art) is a schematic illustration of a conventional substrate coating.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Figure 2:
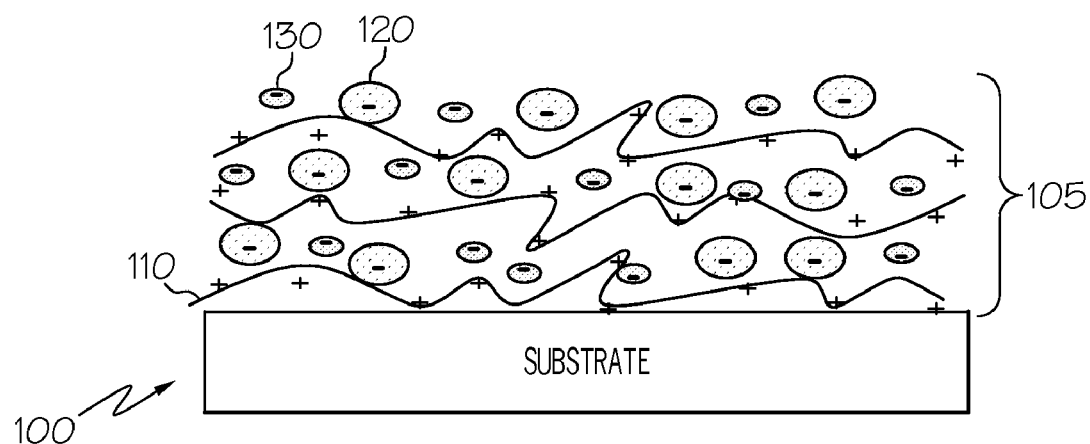
FIG. 2 is a schematic illustration of a multi-layer nanoparticle coating provided on a substrate according to one or more embodiments of the present invention.

Referring to FIG. 2, a substrate 100 (e.g. a metal substrate, an organic substrate, or combinations thereof) coated with a multi-layer nanoparticle coating 105 is shown. The substrate 100 may comprise various compositions, for example, metal based compositions including gold and various grades of stainless steel or polymeric formulations. As used herein, a "layer" may comprise a continuous distribution of particles, a dispersion of particles spaced from one another together, or combinations thereof. The coating 105 comprises an ionic polyelectrolyte layer 110, and an ionic multi-colloid layer (although not numbered, layer is combination of ions 120 and 130) disposed over the polyelectrolyte layer 110. In one exemplary embodiment, the ionic polyelectrolyte layer 110 is cationic and the ionic multi-colloid layer is anionic; however, it is contemplated that the ionic charge may be reversed such that the ionic polyelectrolyte layer 110 is anionic and the ionic multi-colloid layer is cationic.

Further referring to FIG. 2, the ionic multi-colloid layer comprises hydrophilic colloid 130 ions disposed over and coupled to the polyelectrolyte layer 110, and conductive colloid ions 120 disposed over and coupled to the polyelectrolyte layer 110. The conductive colloid ions 120 and the hydrophilic colloid ions 130 are each coupled to the polyelectrolyte layer 105 through electrostatic attraction, dipole-dipole interaction, ion-dipole interaction, van de Waals forces, or combinations thereof. Since the hydrophilic and conductive colloid ions 130, 120 are similarly charged (e.g. both are anions or cations), the conductive colloid ions 120 are separated from the hydrophilic colloid ions 130 by repulsive forces. However, the hydrophilic and conductive colloid ions 130, 120 are both coupled to the polyelectrolyte layer 110 such that the colloids 130, 120 remain in a layer configuration despite the repulsive forces between the colloid ions. Although the present invention is primarily directed to colloids, it is contemplated that non-colloid mixtures, for example, single phase mixtures, may also be used herein.

The cationic polyelectrolyte layer 110 may comprise various compositions suitable to produce cationic or anionic charge such as polyacrylamides or copolymers of acrylamide and quarternary ammonium salts. Such materials are commercially available in powder form as Superfloc C-442 from CYTEC. Any charge density or molecular weight associated with the Superfloc C CYTEC line is suitable for this invention (e.g., C-444 through C-496). Other suitable cationic polymers for attracting anionic colloids include polyallyl amines or polyamido amines, which are both available commercially as either powders or as liquids. Generally, the polymers are dispersed in aqueous media under conditions such that they do not become amphiphilic. For example, solution pH must be maintained below about 7 in the case of the CYTEC copolymers to prevent dissociation of hydrolyzed acrylamide groups. Solution pH may controlled using various acids ($H_2SO_4$, HCl) or bases (NaOH, $NH_4OH$). Alcohols (e.g., isopropanol, ethanol, methanol), surfactants (e.g., Triton X-100, the FC series from Dupont), and electrolytes (e.g., NaCl, KCl, $Na_2SO_4$) may be further added to vary the charge density on both the polymer and the adsorbing colloid. Charge density may be tailored to achieve the desired final coating composition. Alcohol content will range from 0 to 99% by volume and electrolyte content will range from about 0 to about 2 mols.

In the multi-colloid layer, the hydrophilic colloid ions 130 comprise silica nanoparticles and the conductive colloid ions 120 comprise carbon based nanoparticles. For example, the hydrophilic colloid may comprise X-Tec 3408 or 4014 silica nanocomposites from Nano-X or colloidal silica nanoparticles in polishing suspensions manufactured by electron microscopy suppliers such as EMS (Electron Microscopy Supply). Other sources of silica nanoparticles include the Ludox series from DuPont. The carbon based nanoparticles may comprise numerous suitable compositions, for example, graphite flakes, carbon platelets, carbon nanotubes, laser-deposited amorphous carbon spheres, carbon black, or combinations thereof. In one embodiment, the conductive colloid ions may comprise Aquadag E carbon platelets from Acheson. In one embodiment, the conductive colloid may comprise spherical amorpous carbon from Sigma-Aldrich.

In one embodiment, the weight ratio of carbon in the conductive colloid ions 120 to silica in the hydrophilic colloid ion 130 is equal to 15:1 to about 5:1 The carbon to silica weight ratio may be varied to achieve the desired hydrophilicity and electrical conductivity. A weight ratio of between 15:1 to 5:1 is sufficient to maximize both hydrophilicity and electrical conductivity for fuel cell applications. Coating thickness may be controlled to within the diameter of a single colloid particle and may be varied from a few nanometers to hundreds of nanometers depending on the desired durability of the coating. In one embodiment, the coating thickness is about 80 nm to about 200 nm.

The conductive colloid ions 120 may comprise nanoparticles having a thickness of about 5 to about 100 nm, and a width of about 5 to about 800 nm. The hydrophilic colloid ions 130 comprise a width of about 5 to about 100 nm. The cationic polymer layer may include a monolayer thickness of up to about 1 nm. The hydrophilic and conductive anionic nanoparticles are each deposited from separate distinct suspensions having a pH above the iso-electric point of the nanoparticles such that the nanoparticles possess a negative charge and form stable nanoparticle dispersions. The components and amounts of the components (e.g. solids, alcohol, surfactant, and electrolyte content) may be varied to achieve the desired final coating composition. Examples are provided below. Extensions will become obvious to those skilled in the art. Upon formation, the nanoparticle coating 105 has a contact resistance of between about $10^{-5}$ to about 15 m$\Omega$-cm$^2$, an advancing contact angle between about 25° to about 45° and a receding contact angle between about 3° to about 20°.

The following example demonstrates one suitable experimental method for producing the coated substrate as illustrated in FIG. 2. In the experiment, a single bilayer of cationic polyacrylamide (e.g. 0.7 g/l (Superfloc C442) pH 4.6 adjusted with $H_2SO_4$) and carbon platelets (e.g. 5% Aquadag E, pH 5.0 adjusted with $H_2SO_4$) is deposited on a gold surface in a non-uniform arrangement. After deposition, there may be other treatment steps, for example, a thorough rinsing step. Subsequently, the carbon coated gold surface is immersed one or more times in a silica suspension (e.g. 10% x-tec 3408 (Nano-X) in 50/50 EtOH/$H_2O$.). Upon immersion, the non uniform carbon platelets will repel the silica nanoparticles; however, the silica nanoparticles will be attracted to the exposed polyelectrolyte-coated gold surface, thus maintaining the silica and carbon anions in a layer configuration. Although little silica adsorption will occur on the carbon platelets, the resultant structure will be referred to as a "trilayer". Such an approach yielded 8 "trilayer" coatings with a C/Si weight ratio of 12.4 as measured via Energy Dispersive Spectroscopy (EDS), a corresponding thickness of about 160 nm, an advancing contact angle of 42°, and a receding contact angle of 10°.

Referring to the example of FIG. 1, the coating produced an unacceptable 151 mV potential drop at 1 A/cm$^2$ for a substrate coated on both sides during fuel cell experimentation. The substrate consisted of a thin layer of gold electroplated onto 316 L grade stainless steel. In contrast, the coating produced by the experimental example above yielded a potential drop of only 47 mV at 1 A/cm$^2$ under fuel cell experimentation and maintained surface hydrophilicity substantially greater than the bare substrate. The low resistivity is present despite the much lower carbon loading relative to a pure carbon platelet multilayer. The present inventors have recognized that contact resistance is found to be relatively insensitive to increased carbon and silica loadings associated with the deposition of additional layers in the coating 105.

A further example is a repeat of the above with the polymer solution at a pH of 1 rather than 4.6. The resultant coating had a C/Si weight ratio of 6.3, a thickness of about 160 nm, an advancing contact angle of 41°, and a receding contact angle of 9°. The same substrate as in the previous example coated on both sides with the indicated formulation yielded a potential drop of 67 mV at 1 A/cm$^2$ under fuel cell operating conditions.

A further example entails the use of amorphous spherical carbon particles obtained from Sigma Aldrich. The Superfloc C-442 solution was adjusted to pH 5.25 using $H_2SO_4$ and also contained 25% ethanol by volume in water. Polymer concentration was 0.6 g/l. The carbon suspension had a solids content of 0.1% by weight, contained 50% by volume isopropanol, and was adjusted to pH 6.9 using $H_2SO_4$. The silica suspension, which contained 10% by volume X-tec 3408 (Nano-X), 50% by volume isopropanol in water, was adjusted to a pH of about 6 with $H_2SO_4$. The process sequence was identical to that described in the previous example except that 4 trilayers instead of 8 trilayers were deposited. The resultant coating had a C/Si weight ratio of 5.9, an advancing contact angle of 36°, a receding contact angle of 3°, and a thickness of about 80 nm. A cathodically cleaned 304 L stainless steel substrate was coated on both sides with the indicated formulation and yielded a potential drop of only 37 mV at 1 A/cm² under fuel cell operating conditions. This compares to a potential drop of 23 mV at 1 A/cm² for the bare substrate.

The above example was repeated with a different silica suspension: 5% by volume EMS silica in 50% by volume isopropanol and water adjusted to a pH 6 with $H_2SO_4$. The resultant coating had a C/Si weight ratio of 9.9, an advancing contact angle of 26°, a receding contact angle of 4°, and a thickness of about 200 nm. The same substrate as in the previous example coated on both sides with the indicated formulation yielded a potential drop that was undistinguishable from the bare substrate (23 mV at 1 A/cm² under fuel cell operating conditions).

It is noted that terms like "generally", "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A coated substrate comprising a substrate (100) and a multi-layer nanoparticle coating (105) having a thickness of up to about 500 nm thereon, wherein the nanoparticle coating (105) comprises:
    an ionic polyelectrolyte layer (110); and
    an ionic multi-colloid layer disposed over the polyelectrolyte layer, wherein the multi-colloid layer comprises:
        hydrophilic colloid ions (130) disposed over and coupled to the polyelectrolyte layer (110); and
        conductive colloid ions (120) disposed over and coupled to the polyelectrolyte layer (110), the conductive colloid ions (120) being separated from hydrophilic colloid ions (130) by repulsive forces therebetween.

2. The coated substrate of claim 1 wherein the polyelectrolyte layer (110) is cationic and the hydrophilic colloid ions (130) and conductive colloid ions (120) are anions.

3. The coated substrate of claim 1 wherein the conductive colloid ions (120) and the hydrophilic colloid ions (130) are coupled to polyelectrolyte layer (110) through electrostatic attraction, dipole-dipole interaction, ion-dipole interaction, van de Waals forces, or combinations thereof.

4. The coated substrate of claim 1 wherein the substrate (100) comprises metal based material, organic based material, or combinations thereof.

5. The coated substrate of claim 1 wherein the substrate (100) comprises gold, iron, stainless steel, or combinations thereof.

6. The coated substrate of claim 1 wherein the substrate (100) is a surface of a PEM fuel cell component.

7. The coated substrate of claim 1 wherein the polyelectrolyte layer (110) comprises polyacrylamide, polyallyl amines, polyamido amines, or combinations thereof.

8. The coated substrate of claim 1 wherein the polyelectrolyte layer (110) comprises a copolymer of acrylamide and a quaternary ammonium salt.

9. The coated substrate of claim 1 wherein the conductive colloid ions (120) comprise carbon based nanoparticles.

10. The coated substrate of claim 9 wherein the carbon based nanoparticles are graphite flakes, carbon platelets, carbon nanotubes, laser-deposited amorphous carbon spheres, carbon black, or combinations thereof.

11. The coated substrate of claim 1 wherein the conductive colloid ions (120) comprise nanoparticles having a thickness of about 5 to about 100 nm.

12. The coated substrate of claim 1 wherein the conductive colloid ions (120) comprise nanoparticles having a width of about 5 to about 800 nm.

13. The coated substrate of claim 1 wherein the conductive colloid ions (120) comprise silica nanoparticles.

14. The coated substrate of claim 1 wherein the hydrophilic colloid ions (130) comprise a width of about 5 to about 100 nm.

15. The coated substrate of claim 1 wherein the polyelectrolyte layer (110) comprises a width of up to about 1 nm.

16. The coated substrate of claim 1 wherein the hydrophilic colloid ions (130) and the conductive colloid ions (120) each define pH values below the iso-electrical point.

17. The coated substrate of claim 1 wherein the nanoparticle coating (105) has a resistivity of between about $10^{-5}$ to about 15 mΩ-cm².

18. The coated substrate of claim 1 wherein the nanoparticle coating (105) has an advancing contact angle between about 5° to about 45°.

19. The coated substrate of claim 1 wherein the nanoparticle coating (105) has a receding contact angle between about 3° to about 20°.

20. The coated substrate of claim 1 wherein the nanoparticle coating (105) has a thickness of about 80 to about 200 nm.

21. A coated substrate comprising a substrate (100) and a multi-layer nanoparticle coating (105) having a thickness of up to about 500 nm thereon, wherein the nanoparticle coating (105) comprises:
    a cationic polyelectrolyte layer (110) comprising polyacrylamide; and
    an anionic multi-colloid layer disposed over the cationic polyelectrolyte layer (110), wherein the anionic multi-colloid layer comprises:

anionic hydrophilic colloids (130) comprising silica nanoparticles, wherein the anionic hydrophilic colloids (130) are disposed over and coupled to the cationic polyelectrolyte layer; and anionic conductive colloids (120) comprising carbon based nanoparticles, wherein the anionic conductive colloids (120) are disposed over and coupled to the cationic polyelectrolyte layer (110), the anionic conductive colloids (120) being separated from the hydrophilic colloids (130) by repulsive forces.

22. The coated substrate of claim 21 wherein the ratio of carbon in the conductive colloids (120) to silica in the hydrophilic colloids (130) is equal to about 5:1 to about 15:1.

23. A method of providing a nanocoating (105) having a thickness of up to about 500 nm on a substrate comprising:

providing a substrate (100) surface;

applying a solution comprising cationic polyelectrolyte layer and anionic conductive colloids onto the substrate (100) surface, wherein the anionic conductive colloids (120) are coupled to the cationic polyelectrolyte layer (110); and forming the nanocoating (105) by immersing the substrate (100) comprising the cationic polyelectrolytes (110) and anionic conductive colloids (120) in a solution comprising anionic hydrophilic colloids (130), wherein the anionic hydrophilic colloids (130) couple to the cationic polyelectrolyte layer (110) but are spaced from the anionic conductive colloids (120) by repulsion.

24. The method of claim 23 wherein the anionic hydrophilic colloids (130) comprise silica nanoparticles, the anionic conductive colloids (120) comprise carbon based nanoparticles, and the substrate (100) comprises metal based material or organic based material.

* * * * *